June 11, 1929.  W. BARCLAY  1,717,303
AUTOMOBILE BODY FOR INVALIDS
Filed Nov. 12, 1927  2 Sheets-Sheet 1
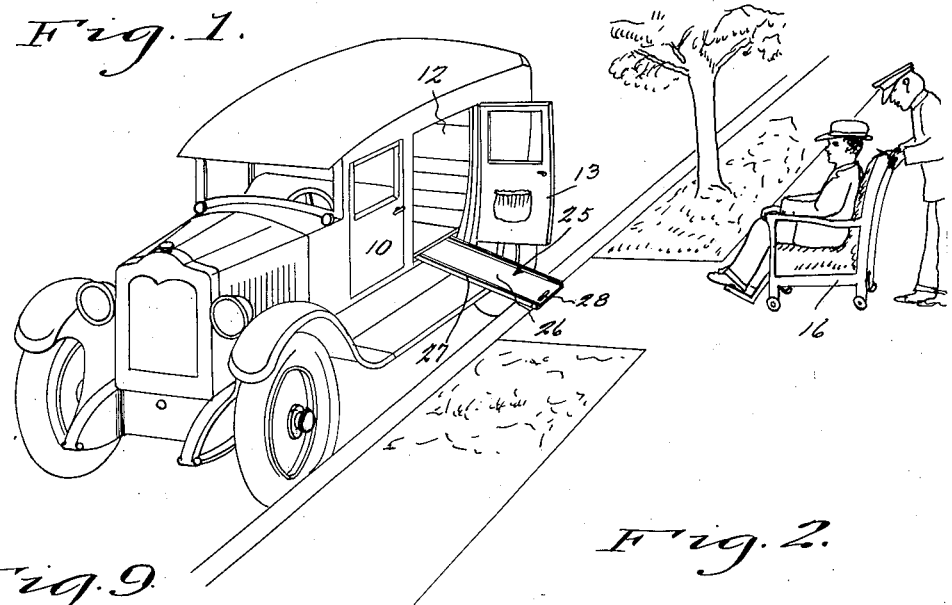
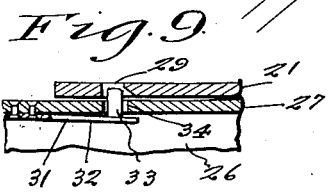
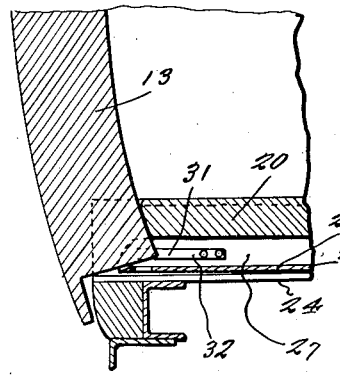
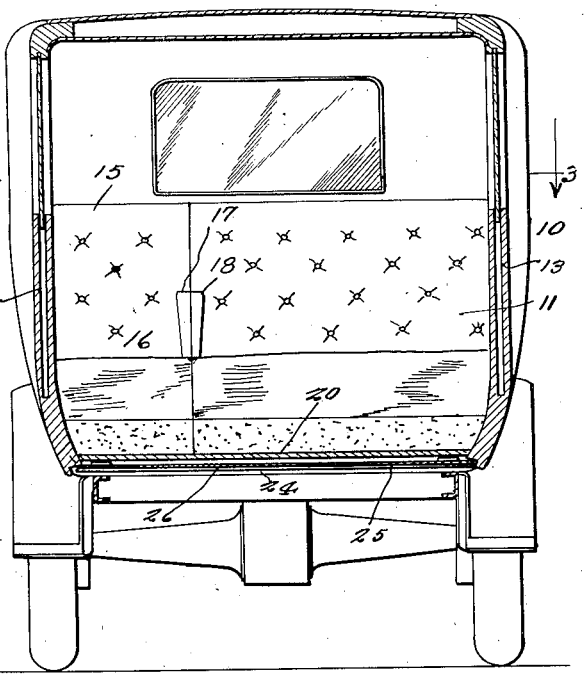
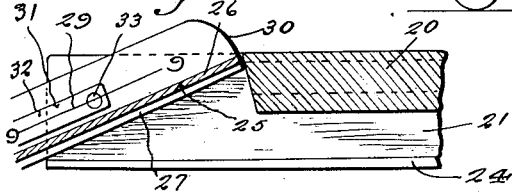
Wright Barclay
INVENTOR
BY Victor J. Evans
ATTORNEY June 11, 1929.　　　W. BARCLAY　　　1,717,303
AUTOMOBILE BODY FOR INVALIDS
Filed Nov. 12, 1927　　2 Sheets-Sheet 2
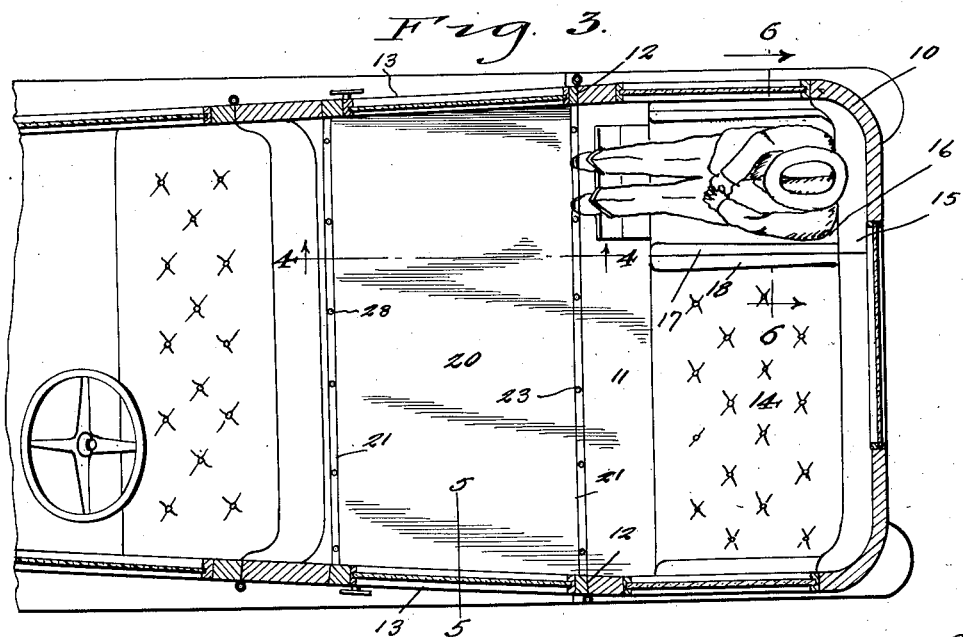
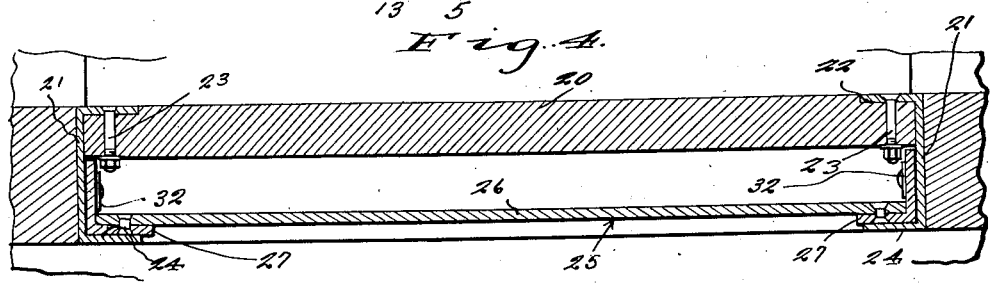
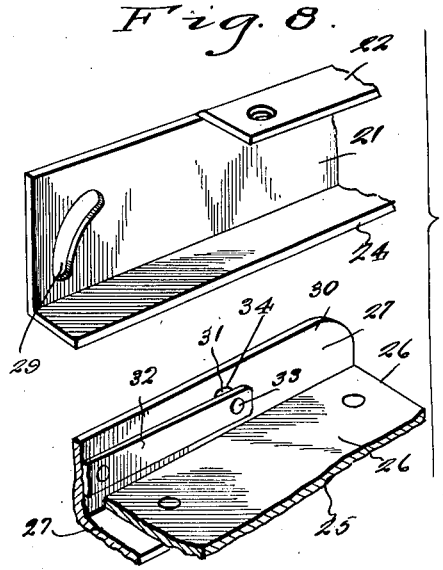
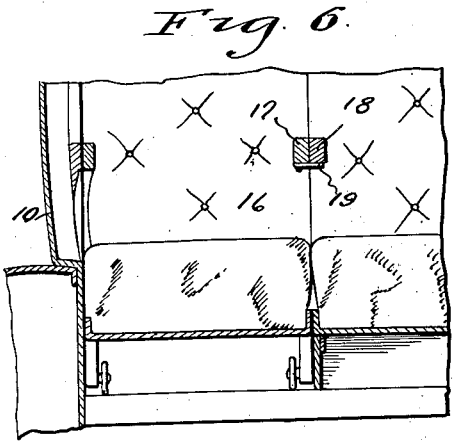
Wright Barclay
INVENTOR
BY *Victor J. Evans*
ATTORNEY Patented June 11, 1929.

1,717,303

UNITED STATES PATENT OFFICE.

WRIGHT BARCLAY, OF NEW YORK, N. Y.

AUTOMOBILE BODY FOR INVALIDS.

Application filed November 12, 1927. Serial No. 232,889.

This invention relates to improvements in automobiles and has particular reference to an automobile body for invalids.

The primary object of the invention resides in an automobile body having a passenger compartment for comfortably receiving an invalid or convalescent person in a wheel chair, there being a skid normally concealed beneath the flooring and which may be pulled out on either side of the body to provide an inclined runway over which the wheel chair may be rolled from the ground level into the passenger compartment. Such a body will eliminate the necessity of lifting an invalid or convalescent in and out of an automobile.

Another object is to provide a skid for passenger automobiles which is slidably mounted beneath the flooring of the passenger compartment for use upon either side depending upon which side of the car is brought against the curb, and which is concealed from view when not in use by the side doors so as not to detract from the attractive appearance of the automobile.

A further object of the invention is the provision of a special automobile body for use by persons unable to enter the automobile by walking and which may be constructed at a cost slightly higher than any ordinary passenger body.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of a passenger automobile showing my invention in use.

Figure 2 is a vertical transverse sectional view therethrough.

Figure 3 is a horizontal sectional view on the line 3—3 of Figure 2.

Figure 4 is an enlarged vertical longitudinal sectional view on the line 4—4 of Figure 3.

Figure 5 is an enlarged vertical sectional view on the line 5—5 of Figure 3.

Figure 6 is a vertical transverse sectional view on the line 6—6 of Figure 3.

Figure 7 is a detail vertical sectional view showing the skid pulled out through one side of the body.

Figure 8 is a detail perspective view of one end of the track and the adjacent side of the skid, the same being in separated condition.

Figure 9 is a detail sectional view on the line 9—9 of Figure 7.

Referring to the drawings by reference characters, the numeral 10 designates the passenger body of an automobile which includes a passenger compartment 11 having openings 12, 12 in opposite sides thereof for allowing ingress thereto and egress therefrom, and which openings are normally closed by swinging doors 13, 13. The back of the compartment is provided with a seat 14 which terminates short of one of the sides of the compartment to leave a parking space 15 for a wheel chair 16. When in position, the arm 17 of the wheel chair fits against the adjacent arm 18 of the seat 14 and is connected therewith by a pivoted latch 19.

The compartment 11 has a removable floor board 20 which extends transversely across the body from door to door and has parallel channel bars 21 attached to the sides thereof. The upper flanges 22 of the channel bars are countersunk in the top of the floor board and have fastening elements 23 passing therethrough for rigidly mounting the same upon said floor board. The lower flanges or tracks 24 are disposed beneath the floor board in spaced relation thereto and serve as tracks for slidably receiving a skid 25. The skid 25 includes an elongated plate 26 of a width approximating the width of the door openings and has angle bars 27 attached to its longitudinal edges with one of the flanges of the angle bars rising vertically to abut the vertical sides of the channel bars 21. The plate 26 is of a length to slightly project beyond opposite ends of the floor board but not far enough to interfere with the closing of the doors when in an inoperative position and has hand holes 28 therein by which it may be grasped for pulling the skid to an extended position.

For the purpose of limiting the extension of the skid when pulled from either side of the body and for allowing the same to swing downward to an inclined position, I provide arcuate shape slots 29 in the channel bars 21 adjacent the extreme outer ends thereof and cut the top flanges 22 so that they terminate with the ends of the floor board. The ends of the vertical flanges 27 of the angle bars are rounded as at 30 to clear the floor board during the swinging movement of the skid, and have spring catches 31 adjacent the ends thereof. Each spring catch includes a flat spring 32 riveted to the vertical flange 27 and carries a pin 33 at its free end which extends through an opening 34 in the said flange. As the skid is pulled outward, the pins ride against the channel bar until reaching the slots 29 whereupon they snap into the arcuate shape slots 29 and serve as pivot pins for allowing the skid to be swung down to a lowered inclined position. By lifting up on the skid to raise it to a horizontal position and pushing inward thereon, the pins will ride out of the slots, thus enabling the same to be moved to an inoperative position beneath the floor board. When the doors 13 are in a closed position, they overlap the ends of the skid and conceal the same against view from the outside.

The body is adapted for use by permanent invalids, convalescents or other persons unable to enter an automobile other than by a wheel chair and in practice, the chair is removed from the passenger compartment and the person seated therein. The skid is pulled out from either side of the body, depending upon which side is against the curb, and swung down to an inclined position to rest upon the curbing as shown in Figure 1 of the drawings. The chair containing the invalid is rolled up the skid or runway and positioned in the space 15 provided therefor and the invalid is then sitting beside the attendant or passengers accommodated by the seat 14. The skid is then slid back to its concealed position and the doors closed. For wheeling the invalid from the automobile body, the same operation is performed with the exception that the chair is rolled down the skid as will of course be understood.

When the skid is in an inoperative position, all of the pins 33 are in locking engagement with the respective slots 29 for preventing accidental shifting and rattling of the skid during driving movement of the automobile.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In an automobile body having opposed door openings therein, parallel tracks suspended beneath the floor of said body, said tracks having slots provided adjacent their ends, a skid slidably mounted on said tracks for extension through either of said door openings, and spring actuated pins carried by said skid and disposed in the path of the respective slots for reception therein when said skid is moved to an extended position for limiting the sliding movements of said skid and for pivotally connecting said skid to said tracks to allow the same to be swung downward to an inclined position.

2. In combination with a supporting structure, parallel tracks mounted on said structure and having slots therein, a skid slidably mounted on said tracks for extension beyond one side of said supporting structure, and spring actuated pins carried by said skid and disposed in the path of the respective slots for reception therein when said skid is moved to an extended position for limiting outward sliding movement of said skid and for pivotally connecting said skid to said tracks to allow the same to be swung downward to an inclined position.

In testimony whereof I have affixed my signature.

WRIGHT BARCLAY.